J. F. HUSA.
CLAMP.
APPLICATION FILED SEPT. 13, 1920.

1,381,308.

Patented June 14, 1921.

Inventor
Joseph F. Husa,
By: Offield, Poole & Shirton Attys.

UNITED STATES PATENT OFFICE.

JOSEPH F. HUSA, OF CHICAGO, ILLINOIS.

CLAMP.

1,381,308.  Specification of Letters Patent.  Patented June 14, 1921.

Application filed September 13, 1920. Serial No. 409,940.

*To all whom it may concern:*

Be it known that I, JOSEPH F. HUSA, a citizen of the United States, and a resident of Chicago, in the county of Cook and State of Illinois, have invented certain new and useful Improvements in Clamps, of which the following is a specification.

This invention relates to improvements in clamps, adapted more especially to meet the many needs for such articles in domestic occupations, as for instance, in securing the lids of cooking utensils, kettles and the like, and for numerous other purposes.

The object of the invention is to provide a simple and inexpensive article of manufacture which may be readily marketed and sold to the retail trade, and so designed as to be capable of use in the various ways that its construction suggests to the user.

Figure 1:
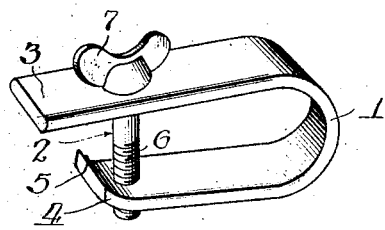
Figure 2:
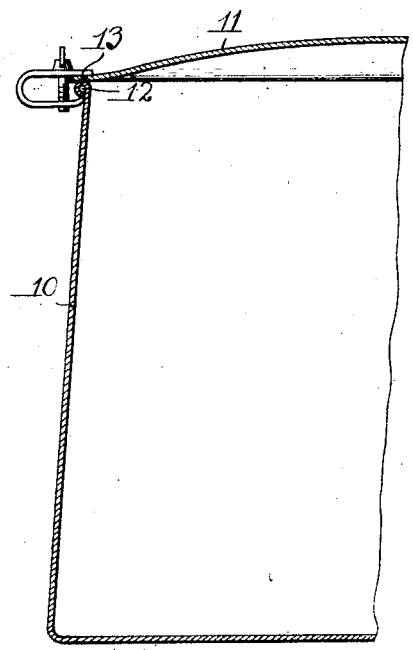

A preferred form of the clamp is herein disclosed, as a means for retaining the cover upon a kettle or container as used for the distilling of water or other liquids. In the accompanying drawing, Figure 1 is a perspective view of the clamp, and Fig. 2 is a view showing a clamp in use.

The clamp comprises two parts; namely, a U-shaped bar 1 and a tension screw 2, said bar being preferably formed of a strip of flat metal stock or wire bent in U-shape with one end extended a short distance beyond the other. As shown in the drawing, the uppermost end portion 3 is the longer, and is straight throughout, whereas the lowermost end portion is provided with an upturned tooth 4 formed by bending the extreme end of the bar toward the opposite end portion and shearing the end at right angles thereto, thus providing a comparatively sharp edge 5 at the end of the tooth 4.

The material of the U-shaped bar is such as to take on a certain degree of resiliency or spring action when bent into final form, so that it yieldingly resists the force tending to compress the end portions together. The screw 2 which obviously serves to draw the ends together and to grip the parts to be clamped, consists of a threaded shank 6, having at one end a winged head 7, or a plain slotted screw head if preferred. The screw extends transversely through the end portions 3 and 4 of the U-bar, engaging a threaded bore located adjacent the tooth 4, and passing freely through a hole formed in the longer end portion 3, the head 7 of the screw being immediately beyond. Obviously this arrangement of the holes and the screw may be reversed.

To clearly show the use of the clamp, a kettle 10 is disclosed having a cover or lid 11, the rim of the kettle being surrounded by a bead 12, and the rim of the cover provided with a flattened flange 13, as is usual in containers of this type. If it is desired to clamp the lid or cover 11 in place, a clamp is applied by inserting the toothed end 4 beneath the bead 12 of the kettle rim, and the straight end over and in flatwise contact with the cover 11, the screw being previously loosened, and the U-bar spread slightly. By tightening the screw, the clamp tightly holds the lid upon the kettle, said clamp being held securely in place by the gripping engagement of the tooth 4 with the bead of the kettle. Obviously it would be necessary to use several of the clamps around the kettle in order to insure a tight closure.

In a like manner, the clamp or clamps would be employed in other ways, the toothed end serving to anchor the clamp to one member to be clamped, and the other and longer end pressing downwardly on the other member, it being observed that the edge 5 of the tooth 4 is at all times located substantially below the center of the bearing surface of the longer end; that is, the surface beyond the screw, so that the clamping force is always exerted through the edge of the tooth and parallel with the screw 2.

The features embodying the invention are hereinafter more specifically set forth in the appended claims, wherein,

I claim as my invention:

1. A clamp comprising a resilient U-shaped bar having an inwardly extending tooth formed at one of its ends and having its other end extended beyond the toothed end, and a screw mounted in the extended end portion of said bar.

2. A clamp comprising a resilient U-shaped bar having an inwardly extending tooth formed at one end and having its other end extending beyond said toothed end, and a screw extending through one end portion of said bar and operable to exert clamping action between the toothed and extended ends of said bar.

3. A clamp comprising a resilient U-shaped bar, having one of its ends bent to form an inwardly extending tooth, and the other end terminating beyond said toothed end in a straight bearing surface, and a screw extending through the end portions of said bar, and having screw threaded engagement with one of said end portions.

In witness whereof, I hereunto subscribe my name this 7th day of September, A. D. 1920.

JOSEPH F. HUSA.